United States Patent [19]

Anderson et al.

[11] 4,025,426

[45] May 24, 1977

[54] APPARATUS AND METHOD USING ACTIVATED CARBON TO PURIFY LIQUID WASTES

[75] Inventors: Richard J. Anderson; Richard B. Leon, both of Rochester, N.Y.

[73] Assignee: Eastman Kodak Company, Rochester, N.Y.

[22] Filed: Jan. 15, 1975

[21] Appl. No.: 541,168

[52] U.S. Cl. .................................. 210/25; 210/40; 210/63 R; 210/186; 210/256; 210/284
[51] Int. Cl.² .................................... B10D 15/06
[58] Field of Search ................ 55/26, 28, 198, 208, 55/233; 210/39, 40, 184–186, 196, 256, 280, 282–284, 25, 17, 150, 151, 63 R; 252/411, 416, 420

[56] References Cited

UNITED STATES PATENTS

| 197,428 | 11/1877 | Thierman | 210/284 X |
|---|---|---|---|
| 2,308,866 | 1/1943 | Dekema | 210/151 X |
| 2,590,148 | 3/1952 | Berg | 210/189 X |
| 2,992,986 | 7/1961 | Ingram | 210/17 |
| 3,231,512 | 1/1966 | Harter | 55/208 X |
| 3,244,621 | 4/1966 | Bouthilet | 210/39 X |
| 3,436,344 | 4/1969 | Canning et al. | 210/39 |
| 3,455,820 | 7/1969 | Joyce et al. | 210/40 |
| 3,510,265 | 5/1970 | Kawahata | 252/420 X |
| 3,730,885 | 5/1973 | Makrides et al. | 210/40 X |
| 3,734,293 | 5/1973 | Biskis | 210/185 |
| 3,779,909 | 12/1973 | Wisfeld et al. | 210/40 X |
| 3,846,296 | 11/1974 | Hay | 210/40 X |
| 3,848,048 | 11/1974 | Moore | 210/39 X |

Primary Examiner—Thomas G. Wyse
Assistant Examiner—Robert H. Spitzer
Attorney, Agent, or Firm—T. N. Dahl

[57] ABSTRACT

An apparatus and method utilizing activated carbon to remove impurities from liquids comprises an adsorption column containing a plurality of stacked carbon containers. Each of the containers holds an activated carbon bed, has an opening above the level of the bed to permit introduction of oxygen, steam or other gas, and has means for permitting passage of liquid from the container. Liquid to be purified enters the top of the column, flows through the carbon beds in the containers and out of the column. A control module monitors the effectiveness of the column and generates signals to control the reactivation of the carbon by heating the carbon containers and passing steam into the individual containers.

9 Claims, 5 Drawing Figures

APPARATUS AND METHOD USING ACTIVATED CARBON TO PURIFY LIQUID WASTES

FIELD OF THE INVENTION

This invention relates to the use of activated carbon to remove impurities from liquids such as those encountered in the photographic, food, textile, sugar, whiskey, organic chemistry, water purification, and metal plating industries. More specifically, the invention concerns an improved apparatus and method utilizing activated carbon to adsorb impurities wherein the carbon in small batches is disposed in a plurality of stacked containers or cups. The apparatus also has the capability of in situ regeneration or reactivation of the "spent" carbon by an improved method to be described.

DESCRIPTION OF THE PRIOR ART

It is well known in the art to use activated carbon to adsorb impurities from liquids.

In very simple, small scale systems using activated carbon, liquid is pumped from a container into a column containing the carbon and then returned to the container. After the carbon is spent, i.e., no longer capable of satisfactory removal of impurities, the carbon is discarded and replaced with fresh carbon. An example of a system of this type is the carbon filtration unit used with many aquariums.

In contrast with the small, simple systems are the large closed systems used in many industries. In these systems, the liquid containing the impurities is pumped into the bottom of a closed hopper containing the activated carbon and the filtered liquid is drawn off the top of the hopper. In large systems when the carbon is no longer capable of adequatelyremoving impurities, the carbon is removed and shipped to another location for bulk reactivation. Such a system is described in an article entitled "Have Treatment Plant, Will Rent" which appeared on page 69 of the Oct. 11, 1972 issue of *Chemical Week*. The article also mentions "the usual operating worries, including reactivation of the carbon that is necessary from time to time."

Another large system is disclosed in U.S. Pat. No. 3.455,820 which describes a process for purifying sewage effluent. The effluent is screened, treated with a flocculant, and allowed to settle. After settling the effluent is passed through at least one bed of activated carbon which functions as a filter and adsorbent for purifying the effluent. When the pressure drop across the activated carbon begins to rise sharply, the carbon is backwashed to remove filtered solids. After several backwashings the carbon is removed for regeneration.

Still another system is disclosed in U.S. Pat. No. 3,244,621 which describes a method of removing organic materials from waste waters. The waste water is made to flow upwards through a column containing activated carbon. The carbon near the waste water inlet removes putrescible material and forms a sludge cake. The sludge cake is removed and burned to reactivate the carbon.

Between the small, simple systems which discard the spent carbon and the large, closed systems which reactivate the spent carbon at another location, are systems which rely on in situ reactivation of the spent carbon such as, for example, that described in U.S. Pat. No. 1,717,103.

Several different processes for reactivating the spent carbon are known in the prior art. A process of particular interest here includes the following basic steps:

a. washing the carbon to remove impurities;
b. heating the carbon to drive off adsorbed molecules;
c. reactivating the carbon by subjecting it to steam or other gaseous vapors while the carbon is at an elevated temperature;
d. cooling the carbon to a temperature low enough to prevent further reactivation;
e. washing the carbon to remove soluble inorganic compounds; and
f. returning the carbon to use.

Some of the problems encountered previously with the reactivation process set forth above include raising the temperature of the carbon uniformly and exposing each carbon granule to hot steam. Reactivation cannot be done in situ in a large bed as there would be highly oxidized carbon at the steam inlet and little or no reaction would occur near the outlet. Attempts to eliminate these problems have included feeding the carbon by gravity through a series of baffles that scatter the granules, and the use of rotary furnaces. Neither technique is entirely adequate, the furnaces usually being quite complex and operating economically only on a large scale. Other problems concern maintaining the ability of the activated carbon to remove impurities after wastes have started flowing through the carbon, extending the length of time the activated carbon can be used before reactivation is necessary or desirable and providing the ability to operate at different flow rates.

SUMMARY OF THE INVENTION

The problems encountered in the prior art have been overcome by the present invention which provides an improved apparatus and method using a column of activated carbon to remove impurities or recover minerals by adsorption from liquids, such as wastes from photographic processing, metal plating solutions, mining wastes, effluents from sewage treating, and from non-waste liquids where the purified liquid is the desired product as in sugar refining, whiskey manufacture, organic chemical manufacture and water purification. The column can also be used to remove Cobalt-60 from water by adding a chelating agent to the water and then passing the water through the column. According to the instant invention, provision is made for using hydrostatic pressures to increase the rate of flow of liquids through the apparatus. Novel means are provided to introduce oxygen, another oxidizing gas or a gaseous mixture into the column of activated carbon at a plurality of points to promote aerobic growth to destroy impurities adsorbed by the carbon thus extending the useful life of the column. Provision is also made for in situ reactivation of the carbon.

In accordance with a preferred embodiment of the invention, an apparatus is provided that uses activated carbon to remove impurities from liquids by adsorption. The carbon is placed in small batches in a plurality of containers or cups which are stacked to form an adsorption column or stack. Liquid is introduced into the column at the top. The liquid trickles down through the carbon in the top cup and leaves the top cup and enters the next cup via a plurality of small holes in the bottom of the cup. After passing in a similar manner through all of the cups, the purified liquid is collected and may be recycled through the column, discarded, or used. Each cup has, above the level of the carbon, a variable-size lateral port to control the introduction of an oxidizing gas (oxygen, ozone, oxygen-enriched air, air, a gaseous mixture, or other gas) to the space above the level of the carbon.

Measurements are taken of the volume of liquid flowing through the column and the oxidizable or combustible carbon content of the liquid as it enters and as it leaves the column. These measurements are fed into a control module to determine the amount of oxidizable carbon removed from the liquid by the column. As the ability of the carbon to remove impurities decreases, the control module increases the flow of oxidizing gas to the space above the level of the carbon to improve the carbon's ability to remove impurities. Eventually, increased oxidizing gas flow does not sufficiently improve the adsorption capability of the carbon. The control module then generates the signals necessary to reactivate the carbon by controlling the addition of water, steam, and burner gas to the column. This novel procedure is especially advantageous when the feed stream contains organic constituents which are not biodegradable, or only partially biodegradable, and are difficult to remove by other means. Waste photographic developers and developer wash waters are examples of such liquids.

Another advantage of the multi-cup adsorption system is that if one desires, electrical connections can be made to each bed. In this way it is possible to apply a direct current potential such that each successive bed has an alternate polarity. By applying a potential in this way the cathodic beds tend to remove metal ions in accordance with well-known electrolytic principles. Due to the excellent contact between carbon granules and liquid, this action is extremely efficient.

The anodic reaction generates oxygen. This provides continuous in situ replacement of oxygen consumed in the catalytic reaction described above. In addition, some oxygen will react so as to form hydrogen peroxide which also acts as an oxidant to further enhance removal of organic or metallic impurities.

A further advantage of generating the oxygen electrolytically is that the flow of current can be automatically regulated to provide the oxygen flow required. This is accomplished by continuously measuring the dissolved oxygen concentration of the effluent leaving the bottom cup and adjusting the current to maintain a dissolved oxygen concentration of at least 6–7 parts per million. The actual adjustment of the electrolysis current can be made by an operator who monitors the effluent oxygen concentration. However, it is preferable to have the adjustment made automatically using a conventional feedback controller.

The invention and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Because activated carbon purification systems are well known, the present description will be directed to elements forming part of, or cooperating more directly with the apparatus and method in accordance with the present invention. It is to be understood that elements not specifically shown or described may take various forms well known to those skilled in the art.

Figure 1:
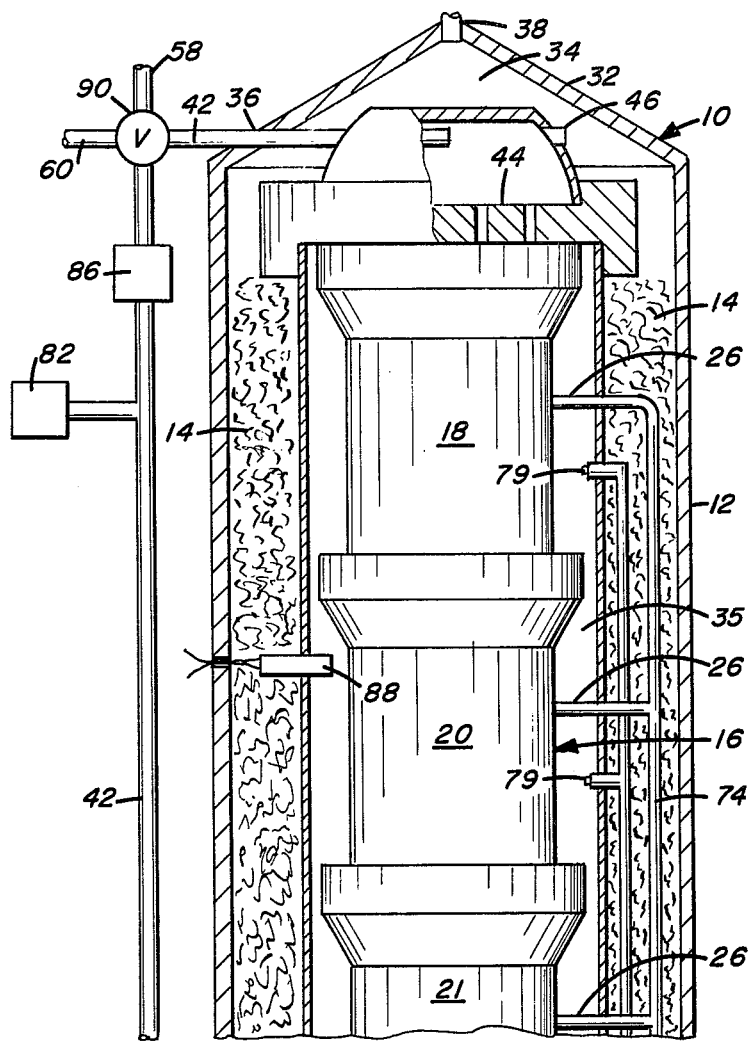
FIG. 1 is a side elevation in partial section of an adsorption column and auxiliary apparatus.
Figure 1:
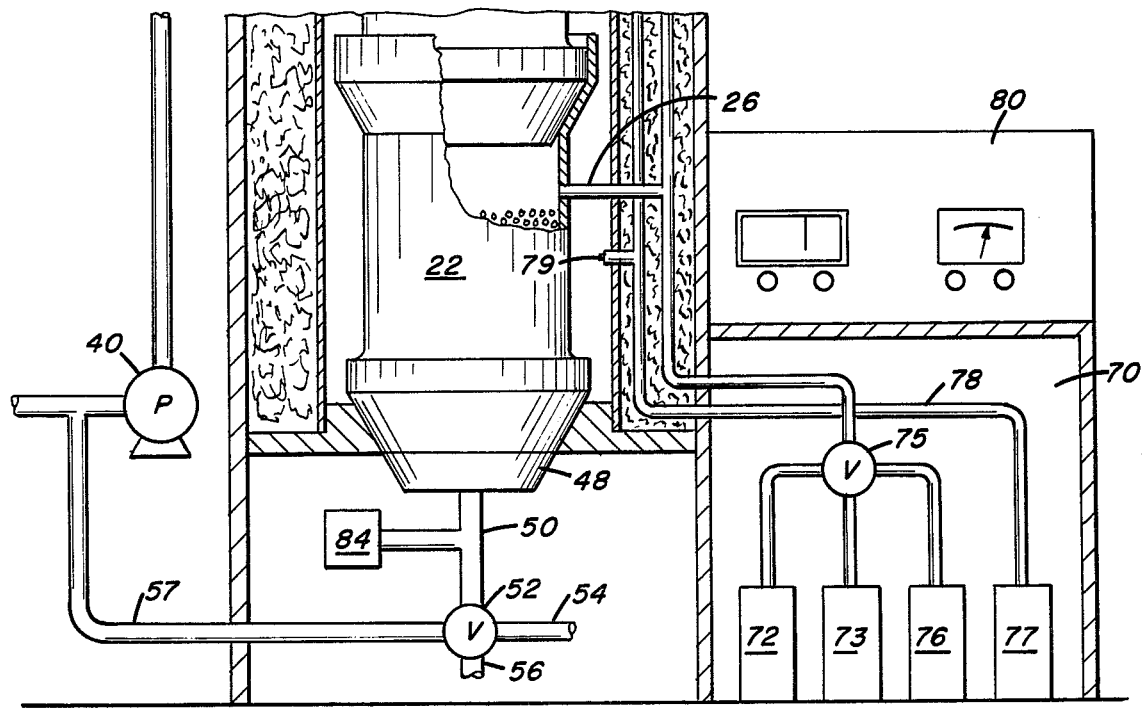

Referring to FIG. 1, the components of an activated carbon adsorption system having self-regenerating capabilities are illustrated. The basic components of the system include one or more adsorption columns (one of which, denoted 10, is illustrated) a gas supply container 70 and a control module 80. The adsorption column 10 includes a housing or shell 12 the inside of which is covered with insulation 14 to minimize heat loss to the surrounding environment when the carbon is being reactivated. A vertical stack 16 of containers or cups partially filled with activated carbon is located within the shell 12 and is comprised of a top carbon container 18, a plurality of intermediate containers 20, 21 and a bottom carbon container 22, all nested together in vertical alignment.

Figure 2:
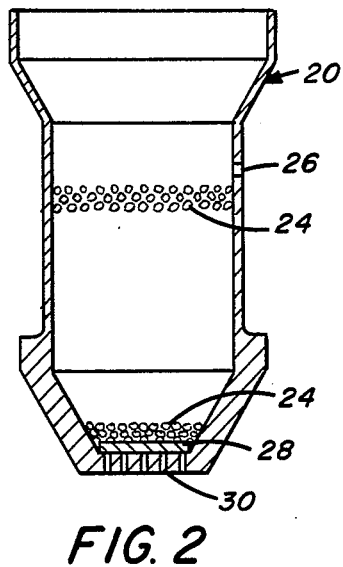
FIG. 2 is a vertical sectional view of a carbon container used in the adsorption column of FIG. 1.

Referring to FIG. 2, wherein an exemplary intermediate container 20 is illustrated, an activated carbon bed 24 is disposed in the intermediate container 20, the level of the carbon bed 24 being below the top of the intermediate container 20 and below an opening or port 26 located in the side of the intermediate container 20 near the top. The size of the opening 26 may be varied by a threaded plug or other means (not shown) to control the amount of gas or steam entering the space above the carbon bed 24. Advantageously, the bottom of the intermediate container 20 can be covered with ceramic fiber cloth, carborundum cloth, perforated ceramic paper or other suitable material 28 having finer porosity than the size of carbon particle used, so as to contain the carbon in the intermediate container 20 without restricting liquid or vapor passage through a plurality of small holes 30 in the bottom of the intermediate container 20. The side walls of the intermediate container 20 are flared at the top and tapered at the bottom to facilitate the stacking of containers. From a standpoint of ease of manufacture, it is desirable to have the top carbon container 18, the intermediate containers 20 and 21 and the bottom carbon container 22 be of substantially identical construction. The use of individual containers made of heat resistant ceramic or other material with a low coefficient of thermal expansion permits the vertical stack 16 to expand and contract thermally without structural damage under the influence of temperature changes during reactivation, allows economical replacement of damaged containers, and facilitates fabrication of different length adsorption columns. Suitable ceramics are silicon carbide and Alundum alumina. However, if the stack 16 is to be used only for adsorption without subsequent high temperature reactivation, the cups need not be of refractory material. For example, acrylic plastic cups having stainless steel bottom screens can be used.

Referring again to FIG. 1, between the top of the vertical stack 16 of carbon containers and the adsorption column housing cover 32 is located an upper combustion chamber 34. The cover 32 also has an inlet feed opening 36 and a gas vent opening to which an exhaust pipe 38 is connected.

Liquid to be purified is delivered to the adsorption column 10 by a pump 40 or other suitable means through a liquid feed pipe 42 which passes through the inlet feed opening 36 and is connected to a liquid distributor 44 at the top of the vertical stack 16. The liquid distributor 44 distributes the liquid over the top of the carbon bed 24 in the top carbon container 18.

In operation, the liquid drips on the top of each carbon bed 24, trickles down through the bed, leaves the bed through the multiplicity of small holes 30 in the bottom of the container and enters the next container. Purification of the liquid occurs within the carbon beds 24 within each container. When operated within design flow limits there is no free liquid in the space above the carbon. Under surge conditions, liquid builds up in the space above the carbon which provides a higher pressure head and hence higher flow. The system is designed to operate at flow rates which do not cause liquid to overflow the containers.

One advantage of the drip container design is the use of evaporation to increase the adsorption capacity of the carbon. To explain, as the liquid drips from container to container, some liquid evaporates, creating adiabatic cooling. Since adsorption capacity increases with decreasing temperature, the adsorption capacity of the carbon is enhanced as it cools. This cooling is increased by feeding an oxidizing gas from a gas supply 72 or the atmosphere, via a control valve 75 through gas supply pipe 74 and individual openings 26, into the space above the carbon beds 24 in each container. During reactivation the oxidizing gas or a purge gas from supply 73 can be added to purge the vertical stack 16 as the gas flows upwardly through the small holes 30 in successive containers into the liquid distributor 44 and then out through vent 46 into the combustion chamber 34.

A further advantage of the drip container design results from oxygen enrichment which occurs during dripping. The availability of dissolved oxygen in the liquid promotes aerobic bacterial growth within the bed as shown in FIGS. 3a–d discussed below. This is especially so if the bed is reactivated infrequently. It has also been found that by adding an oxidizing gas to the system, it is possible to increase the adsorption capacity of the carbon and thus postpone the need for reactivation. Anaerobic bacterial growth may also occur adjacent to the carbon particles and within the larger pores. Either type of bacterial growth, however, will destroy some of the adsorbed molecules, thereby improving column efficiency.

Figure 3:
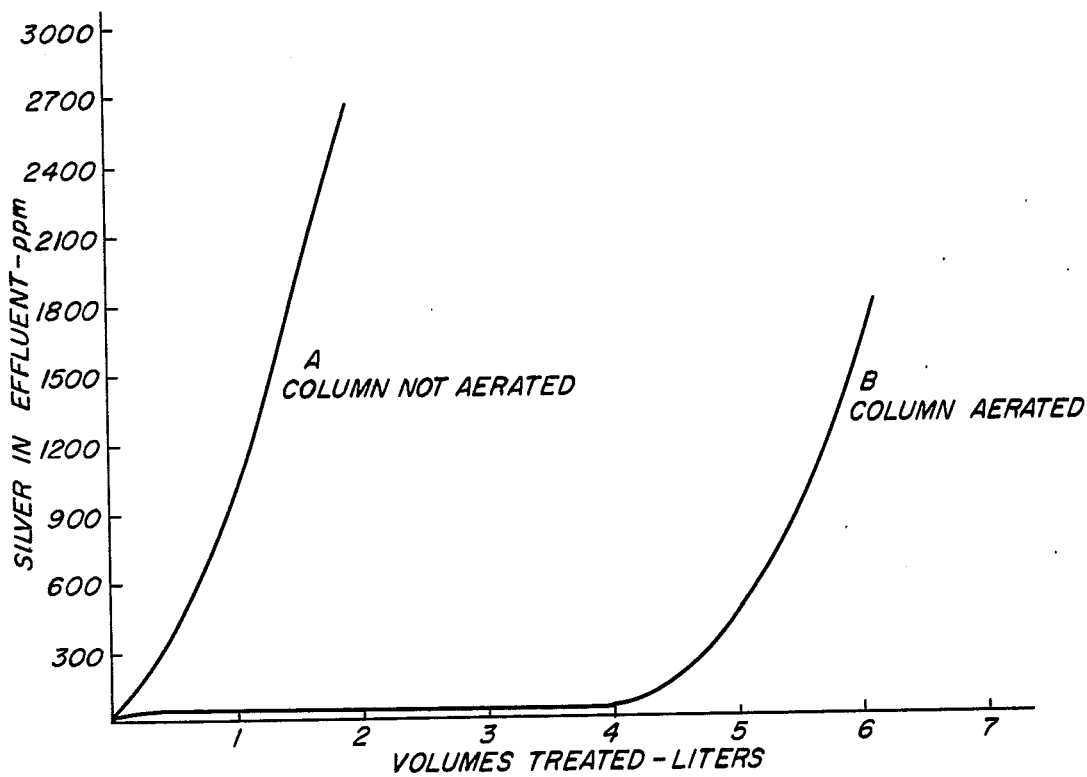
FIGS. 3 and 4 show a set of curves which depict the effects of the addition of an oxidizing gas on adsorption column efficiency.
Figure 4:
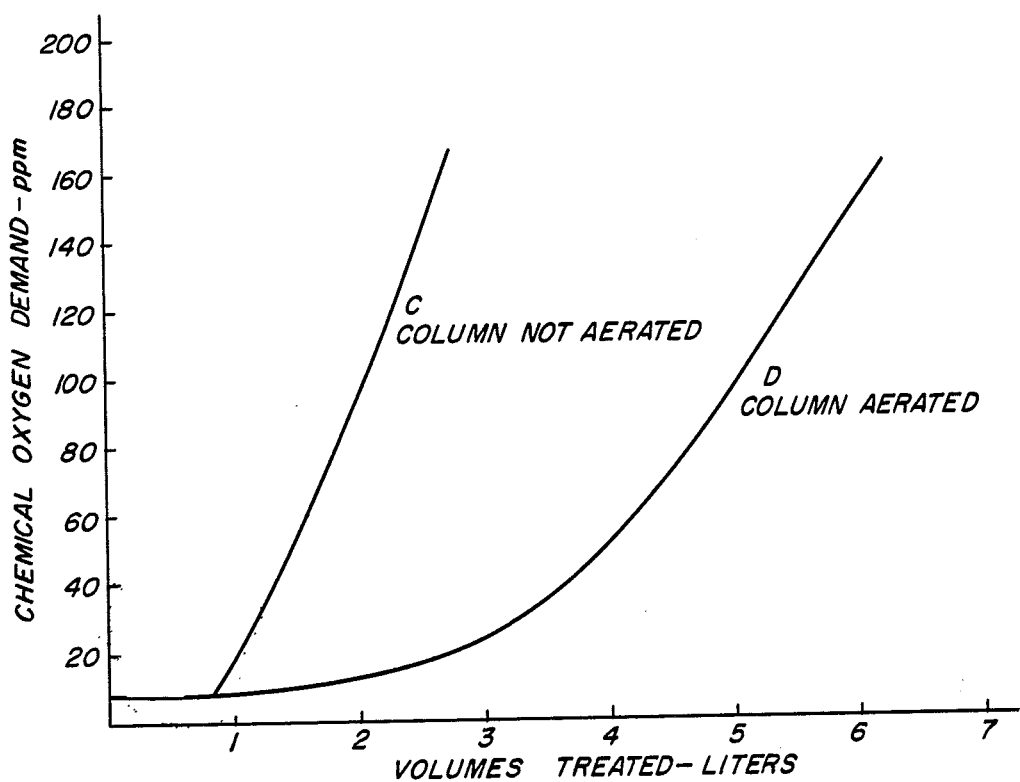

Referring now to FIGS. 3 and 4, the effects of adding varying amounts of an oxidizing gas to the same adsorption column during operation may be seen. FIG. 3 plots the silver concentration or level in a photographic fixer liquid, after it has passed through the adsorption column, against the volume of liquid treated. In the example under consideration, the liquid was fed the adsorption column at a rate of 160 cc/min and contained 5,000 ppm of silver in a 197 g/l aqueous solution of ammonium thiosulfate. Curve B (which is for an adsorption column with aeration) clearly shows that more silver was removed with aeration than without aeration as depicted by curve A.

FIG. 4 shows the beneficial effects of aeration on chemical oxygen demand (COD) when the column was operated with feed at 25° C and pH 7, with a retention time of 1 hour. The calculated COD of the feed (a 0.5 g/l aqueous solution of the diammonium salt of ethylene diamine tetraacetic acid) was 390 ppm. Curve D, which is for an adsorption column with aeration, shows that the COD of the effluent from an aerated column was much lower than the COD of the effluent from a non-aerated adsorption column operated under otherwise similar conditions, as shown in Curve C. However, curves A and C show that even without aeration the column operated successfully to extract components from the feed.

After the treated liquid leaves the bottom of carbon container 22, it enters into a purified liquid collection space 48 which is connected by a pipe 50 to a control valve 52. The valve 52 either directs the purified liquid through pipe 54 to a sewer (not shown), through pipe 56 to a storage tank (not shown) or through pipe 57 back to the liquid feed pipe 42 for recirculation through the adsorption column 10.

Figure 5:
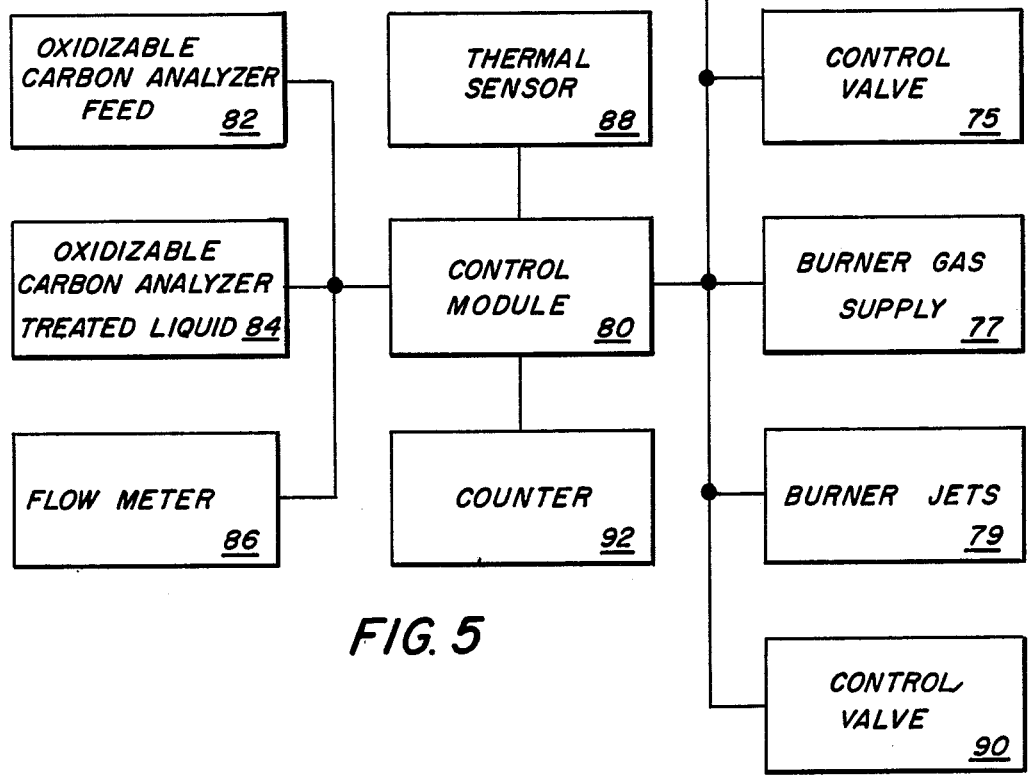
FIG. 5 is a schematic diagram of the integrated control system used with the adsorption column.

The system for controlling the reactivation of the carbon beds 24, as shown in FIG. 5, basically comprises control module 80, a feed oxidizable carbon analyzer 82, a treated liquid oxidizable carbon analyzer 84, a flow meter 86, a thermal sensor 88, an input flow valve 90, control valve 52, control valve 75, a burner gas supply 77, burner jets 79, and a counter 92. In operation, the flow meter 86 measures, and generates a signal representative of the volume of liquid flowing through the adsorption column 10. The feed analyzer 82 and treated liquid analyzer 84 measure and generate signals representative of the combustible carbon content of liquid as it enters and as it leaves the adsorption column 10. A type of analyzer that can be used for this purpose burns a small, constant quantity of the liquid in a hydrogen flame. The $CO_2$ concentration in the combustion product gas, measured by an infrared or other analyzer, indicates the amount of burnable carbon in the liquid. Such analyzers are commercially available from Beckman Instruments Co. or Bendix. Alternatively, when the liquid contains only a single adsorbable impurity, a simpler more direct analysis of the treated liquid can be performed without the need for a combustion step. The signals from the analyzers 82 and 84 are fed to a summer within the control module 80. The summer is an operational amplifier wired so its output is proportional to the difference in readings of the feed analyzer 82 and the treated liquid analyzer 84. The difference in reading is a measure of the change in impurity concentration. When the difference is multiplied, using a multiplier in an integrated circuit module, by the signal from the flow meter 86, the resultant signal is proportional to the rate of removal of impurities. Further, when the rate signal is integrated with respect to time, the total amount of impurities removed is determined. The integration referred to is accomplished by using the output of the multiplier to charge a low-loss tantalum capacitor. When the voltage across the capacitor reaches a predetermined level, it is discharged thereby generating a pulse. The pulse leaves the control module 80 and triggers the first stage of an eight-stage digital counter 92. The total count stored in the counter 92 is a measure of the total amount of impurities removed by the adsorption column 10. When the total count (or total pulses counted) reaches a predetermined value or the output of the summer in the control module 80 exceeds a predetermined value, a signal is generated which either directly or indirectly (through operator intervention) starts the reactivation process. Alternatively, the adsorption capability of the carbon beds 24 is partially restored by flushing the adsorption column 10 with a water or acidic wash.

REACTIVATION

After extensive use, the ability of the carbon beds 24 to remove impurities from feed liquids is exhausted and the carbon must be reactivated. The various analyzer, valve actuations and functions described below can be performed manually by an operator; however, automatic operation is preferred and will be described in detail as the best mode.

Automatic operation is controlled either on a time-programmed basis or on an automatic control basis. When a time-programmed basis is used, a master timer in the control module 80 generates signals to control such operations as steam addition, water wash and heating. The signals initiate and terminate each operation at a preset point in the cycle. The length of the cycle is determined by the number of counts stored in the counter 92. When an automatic control basis is used, the temperature within the adsorption column 10, as measured by one or more thermal sensors 88 located within the combustion space 35 and/or the carbon beds 24, is used by the control module 80 to determine when to turn each operation on and off. Once the reactivation cycle has been established and properly programmed for a given process and adsorption column, no operator attention is required to reactivate the adsorption column.

Considering a specific example, the steps in the reactivation process are as follows:

a. The input flow valve 90 is signalled to divert the flow of liquid through pipe 58 to a storage tank (not shown) or to another adsorption column (not shown). Alternatively, pump 40 can be stopped. Fresh water is then piped from a supply conduit 60 through the feed pipe 42 to flush the vertical stack 16 of carbon containers, thereby removing any soluble salts.

If the adsorption column 10 has been used to remove toxic metals, it is desirable to flush the vertical stack 16 with an acidic wash before, or instead of, the wash with fresh water. (It has been found that an acid wash of approximately 5% HCl is effective in dissolving the toxic metal oxides.)

The acid wash has an additional beneficial effect in that it removes $Na^+$, $Ca^{++}$ and $Mg^{++}$ ions. These ions are not considered pollutants when present in low concentration. However, if not flushed from the carbon beds 24, they will remain in the carbon pores during the subsequent drying step and, during the reactivation step, catalyze oxidation of the carbon so as to degrade subsequent bed performance and shorten bed life.

b. After draining for about 10 minutes to remove free water, the vertical stack 16 is then heated by gas flames applied to the outside of the carbon containers, first to dry the carbon and then reactivate it. Purge air is furnished to the openings 26 from supply 73 or other source while combustible gas (e.g. natural gas or other combustible gas or gases) from a burner gas supply 77 is supplied through a connecting header conduit 78 to burner jets 79 and ignited catalytically by platinum wires or by other methods well known to the art.

During initial heating, the remaining water is vaporized at a temperature of 200°–300° F. The purge air, supplied to openings 26 through the gas supply pipe 74 helps remove the water vapor. However, some of the vapor escapes between the containers into the combustion space 35 and is combusted with the burner gas. The remaining vapor passes upward through the vertical stack 16 and escapes through a vent 46 in the liquid distributor 44 into the combustion chamber 34 where it combines with the burner gas combustion product and is combusted. Additional air may be added to the combustion chamber from a source (not shown) to ensure complete combustion. After combustion, the gas products are vented through exhaust gas pipe 38. The control signals automatically vary the supply of purge air, combustion gas and burner air flow rates as the bed temperature increases. Initially a high flow of purge air is desirable since it will speed up the evaporation. When the bed has reached reactivation temperature, use of purge air may result in undesirable excessive oxidation of the carbon so that it is advantageous to introduce nitrogen, argon or other inert gas from a source (not shown) in the gas supply container 77 in place of the air. The same reasoning applies to the burner air/combustion gas ratio. Initially excess air is desirable, but when the bed has reached reactivation temperature, the excess air should be reduced to that minimum which will prevent depositing soot.

c. As the temperature increases in the carbon beds 24, some of the adsorbed molecules are driven off. Heavy adsorbed molecules are decomposed as a result of the baking action at a temperature of 600°–800° F. in the presence of moist nitrogen or argon with subsequent release of gaseous byproducts. The decomposition begins when the temperature is well below the ignition point. Thus the byproducts are initially carried off by the flow of purge gas. As previously explained, some of the byproducts escape between the containers and are burned in combustion space 35 where flames are present. The remainder are combusted in the combustion chamber 34.

d. When the temperature in the carbon bed has increased to the design level (approximately 1500° to 1700° F.) as measured by the thermal sensor 88 35, steam from steam supply 76 is injected into the openings 26 at the top of each container through the gas supply pipe 74 or a separate steam supply pipe (not shown). The steam contacts the carbon in the vicinity of the point of injection thus exposing the carbon granules to the hot steam. The resulting water-gas reaction reactivates the carbon by creating a new porous structure. Steam can be injected continuously or discontinuously in a pulsed flow. The latter is advantageous because it briefly fluidizes the carbon in each container, providing better flow distribution between particles than occurs with continuous steam flow. Instead of pure steam, there can be used a gas composition containing 50% $N_2$, 6% $CO_2$, 43% $H_2O$, and 1% $O_2$ by volume.

e. The final step in the reactivation process is to cool the carbon to a temperature low enough to prevent further reaction, e.g., to below 1500° F. Once the carbon has been steam-activated, further reaction is undesirable since it consumes carbon without improving adsorptive properties. The cooling is done by water-quenching the column with water supplied from supply conduit 60 through feed pipe 42. Following the cooling, the carbon is washed with fresh water to remove soluble inorganics and is then ready to remove impurities from liquids again.

The reactivation process is controlled by a flexible timing cycle with changes made to accommodate process changes. Thus, one activated carbon adsorbing column 10 and control module 80 can be used for applications requiring different timing. A control panel on the control module 80 includes push buttons such that, when changing processes, the operator need only press the button labeled with the process name to introduce the correct preset timing sequence for that process.

It is also possible to operate the carbon adsorption system of the present invention in a fully automatic, closed-loop cycle. One embodiment contemplates a system with two or more adsorption columns one of which serves as the operating column. Feed liquid is routed to the operating column and the treated liquid analyzer 84 produces a signal which is a function of the impurity of liquid after passing through this column. At a preestablished impurity level, the control module 80 produces signals to direct the feed liquid to a fresh operating column and to initiate automatic reactivation of the spent column.

Alternatively, in accordance with another embodiment, a single column is utilized. A holding tank is used in conjunction with the column to allow liquid to be fed continuously, held or stored during the reactivation period, and allowed to flow during the remaining time. Increased flow is permitted immediately following reactivation, allowing the holding tank to empty.

The following examples are included for a further understanding of the invention:

EXAMPLE 1

Removal of Silver From Photographic Fixer

Sufficient silver was added to an unseasoned aqueous ammonium thiosulfate feed to provide a 5 g/l concentration, simulating a waste fixer solution. The fixer was pumped at 10 cc/min (1 hr. contact time) and allowed to drip down through a stack of 10 acrylic plastic containers containing activated carbon. The feed pH was adjusted to 4.7 while the dissolved oxygen (D.O.) was 6.3 ppm, both values remaining constant during the entire run. After 1 bed volume, the effluent D.O. was 2.7 ppm and the pH was 8.1. After 4 bed volumes, the respective values were 0.7 ppm and 6.7. As the test progressed, effluent D.O. levels continued to decline further from the feed value; however, the effluent pH began approaching that of the feed. Two other measurements taken periodically were feed and effluent silver and chemical oxygen demand (COD) levels. Silver effluent levels were less than 1 ppm for the first half bed volume (200 ml), climbed rapidly to 30-40 ppm and remained at that level for the next four bed volumes at which point breakthrough occurred. Silver uptake capacity through the four bed volumes was 3.6 gm/100 gms carbon.

Effluent COD rapidly approached that of the feed, the transmission $$\frac{\text{COD out}}{\text{COD in}}$$

being 60% after less than 1 bed volume. During this test there was no oxygen feed to the column.

EXAMPLE 2

Removal of Cadmium and Chelating Agent

An aqueous photographic developing solution feed containing 5 ppm cadmium and 1 g/l of 1,3-diamino-2-propanol tetraacetic acid chelating agent at pH 7 was pumped to the 10-cup stack containing activated carbon, in identical fashion to that described in Example 1. With this run, however, pure oxygen was pumped into each stage of the column beginning at a total flow of 13 cc/min. The dissolved oxygen and pH of the effluent exhibited a similar relationship to the feed values as observed with Example 1. The presence of more oxygen, however, provided an additional capability, namely that effluent COD levels could be significantly reduced by raising the oxygen flow rate. Once the effluent COD levels began to increase at a set oxygen flow rate, usually after 2 or 3 bed volumes, higher oxygen flow rates reduced the COD. Eventually a point was reached at which higher oxygen flow rates (above 160 cc/min) did little to reduce effluent COD. It was noted that the cadmium level for the first nine bed volumes was less than 0.01 ppm but that a breakthrough occurred sharply, and at 12 bed volumes the level was 0.85 ppm. Effluent COD transmission was less than 10% for the first 2 bed volumes; however, the COD increased steadily to about 40% and required subsequent oxygen flow rates of 20, 37, 100 and 160 cc/min to maintain the 40% level.

The invention has been described in detail with particular reference to certain preferred embodiments thereof, but it will be understood that variations and modifications can be effected within the spirit and scope of the invention.

We claim:

1. An apparatus using activated carbon to remove impurities from liquid comprising:
    an adsorption column comprising a vertical stack of at least two containers, each of said containers being partially filled with an activated carbon bed and having an opening above the level of the carbon bed, each of said containers having, in the bottom thereof, means for providing the passage of liquid from the container into the next lower container in said stack;
    means for delivering liquid to the top container of said stack;
    means for removing liquid from the bottom container of said stack after passage through said stack; and
    means for in situ reactivation of the carbon, said means comprising:
        an outer housing spaced from and enclosing said stack;
        a steam supply;
        means for connecting said steam supply to each said opening of said containers so as to make steam available for the activation of the carbon;
        a burner gas supply;
        at least one burner jet located within the space between said outer housing and said stack;
        means connecting said burner gas supply to said burner jet; and
        a water supply for supplying water to said column to rinse said column before heating and to quench said column after heating.

2. Apparatus in accordance with claim 1, also comprising means for introducing an oxidizing gas through said openings into the space above the carbon beds thereby evaporating a portion of the liquid and enriching the liquid, as it passs from the next higher container, with the gas.

3. An apparatus in accordance with claim 1, further comprising control module means for automatically controlling said steam supply, said burner gas supply, and said water supply.

4. An apparatus in accordance with claim 3 wherein said control module means further comprises apparatus for measuring the amount of combustible carbon removed from liquid be activated carbon contained in said containers of said adsorption column, said apparatus being comprised of:

meter means for measuring and generating a first signal representative of the volume of liquid flowing through said column;

first analyzer means for performing a first measurement of the combustible carbon content of said liquid before entry of said liquid into said column and for generating a second signal representative of said first measurement;

second analyzer means for performing a second measurement of the combustible carbon content of said liquid after said liquid leaves said column and for generating a third signal representative of said second measurement;

comparator means for generating a fourth signal representative of the difference between said second and said third signals; and means for multiplying said first signal by said fourth signal to determine the amount of combustible carbon removed from said liquid during passage through said adsorption column.

5. A method for treating a liquid containing impurities to remove the impurities therefrom, said method comprising:

trickling the liquid downwardly successively through a series of activated carbon beds disposed in a stack of containers arranged one above the other, with the top of each bed being spaced from the adjacent next higher bed in said series;

introducing an oxidizing gas into the space between adjacent beds;

removing the purified liquid from the bottom of the lowest bed in the series;

performing a first measurement of the level of impurities in the liquid before the liquid is trickled through the beds;

performing a second measurement of the level of impurities in the purified liquid;

generating a signal representative of the difference between said first and second measurements; and automatically varying the flow of oxidizing gas to said spaces between the beds in response to changes in said signal.

6. A method according to claim 5, further comprising automatically terminating the flow of liquid to the beds when said signal reaches a predetermined minimum value.

7. A method in accordance with claim 5 wherein said liquid contains dissolved metal ions as impurities, said method also comprising adding to said liquid a sufficient amount of chelating or complexing agent to complex the metal ions before said trickling step.

8. A method in accordance with claim 5 wherein said liquid is aqueous and said oxidizing gas is oxygen and is generated by in situ electrolysis within said beds.

9. A method for treating a liquid containing impurities to remove the impurities therefrom, said method comprising:

trickling the liquid downwardly successively through a series of activated carbon beds disposed in a stack of containers arranged one above the other, with the top of each bed being spaced from the adjacent next higher bed in said series;

introducing an oxidizing gas into the space between adjacent beds;

removing the purified liquid from the bottom of the lowest bed in the series; and periodically interrupting the flow of liquid to the beds to allow reactivation of the beds by:

passing a liquid wash through said beds to remove soluble salts therefrom;

heating said beds while introducing an oxidizing gas to said spaces between said beds;

stopping the flow of oxidizing gas at a predetermined temperature;

adding an inert gas to said spaces between said beds;

injecting steam into said spaces between said beds; and cooling said beds.

* * * * *

UNITED STATES PATENT AND TRADEMARK OFFICE
CERTIFICATE OF CORRECTION

PATENT NO. : 4,025,426
DATED : May 24, 1977
INVENTOR(S) : Richard J. Anderson and Richard B. Leon It is certified that error appears in the above-identified patent and that said Letters Patent are hereby corrected as shown below:

Column 8, line 19, change "77" to -- 70 -- ;

line 40, delete "35".

Column 10, line 65, change "passs" to -- passes --.

Column 11, line 6, change "be" to -- by --.

Signed and Sealed this

Eighteenth Day of April 1978

[SEAL]

Attest:

RUTH C. MASON
Attesting Officer

LUTRELLE F. PARKER
Acting Commissioner of Patents and Trademarks